July 14, 1925.  1,546,080

L. M. JEPPSON

HORSE COLLAR PAD

Filed Feb. 3, 1925.

Inventor
L. M. Jeppson,

By
Attorney

Patented July 14, 1925.

1,546,080

UNITED STATES PATENT OFFICE.

LEON MORSE JEPPSON, OF MURRAY, UTAH.

HORSE-COLLAR PAD.

Application filed February 3, 1925. Serial No. 6,573.

*To all whom it may concern:*

Be it known that I, LEON MORSE JEPPSON, a citizen of the United States, residing at Murray, in the county of Salt Lake and State of Utah, have invented certain new and useful Improvements in a Horse-Collar Pad, of which the following is a specification.

This invention relates to an improved pad which is adapted to be used in connection with horse collars, and the same is especially, but not necessarily designed for use upon heavily burdened working horses.

The commonly marketed horse collar pad is, as far as I know, of uniform thickness from end to end, and when in use it provides an improper and poor fit in the majority of instances. It has been my experience to note that the average collar and pad equipment does not make for the necessary comfort required to permit the animal to give best service. The conventional pad, being of uniform thickness, exerts a pressure upon the animal substantially from end to end. In this way certain of the muscles, which are expanded when under undue strains, are forcibly pressed inwardly, thus resulting in sores and other injurious effects.

In view of the foregoing circumstances I have evolved and produced a novel form of pad which is highly adaptable for use with the commonly marketed collar, the improved pad constituting a form fit pad and serving to relieve the otherwise excess pressure by conforming, as near as possible to the shape of the animals on which the pads are used.

The specific construction employed for accomplishing the end sought will be clearly apparent from the following description and drawing.

In the accompanying drawing forming a part of this application and in which like numerals are employed to designate like parts of the same:

Figure 1:
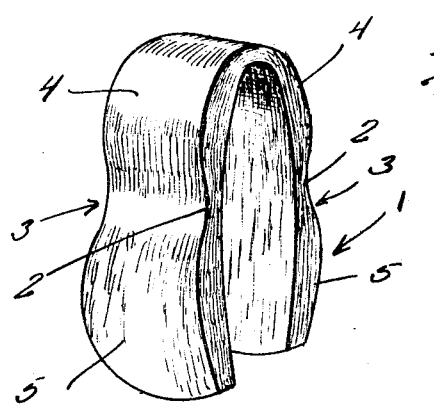
Figure 1 is a perspective view of one embodiment of the improved pad.

At the outset, I would state that I am aware of the fact that it is not entirely new to provide a form fitting pad for animals of the class described. In some instances where the owner of the animal has sufficient money, a single pad accurately fitted to a particular animal may be had. However, where large numbers of work horses are concerned, it is too expensive indeed to have an especially fitted collar pad for each animal. Therefore, after careful study, I have observed that approximately three different shapes or embodiments of pads may be selectively utilized for supplying almost any demand.

The principle of operation of the improved pad is substantially the same in all embodiments. Owing to the extreme analogy of the three species or embodiments illustrated, it is thought that they may all be considered in a generic sense, and for this reason the same reference characters designate corresponding parts throughout all views.

To this end, the reference character 1 designates generally the improved pad which may be of any appropriate flexible and compressible material, for instance, of the kind ordinarily employed in making the commonly marketed pad. Observing the new pad closely it will be seen that so far as length and width is concerned, it is identical substantially, with the well known collar pads now sold. In fact the general configuration is almost identical. The improvement consists in varying the thickness at opposite points as indicated at 2. In so varying the thickness a pair of opposed channels are formed, the same being generally referred to by the reference character 3. In order to enable a clear comprehension of the invention to be obtained, the points 4 and 5 on the opposite sides of each channel may be referred to as collar contacting portions or rests. The thinned portions 2 forming the so-called channels are comparatively flexible to the portion on opposite sides of the channel. In fact the construction is such as to render the portions 2 comparatively flexible, the degree of flexibility being sufficient to permit these portions to conform approximately to the shape of the muscles over which they pass.

Under ordinary conditions with the pad surrounded by the conventional collar, it will be seen that portions of the collar at substantially diametrically opposite points will bridge the channels and will bear upon the points 4 and 5. In this way the portions 2 are allowed to flex toward the collar to permit them to conform to the muscles as stated and to relieve the same from undue pressure. Owing to the different builds of the animals, the proportions of the pad will necessarily vary somewhat. However, I contemplate making the three embodiments shown in the drawing.

Figure 2:
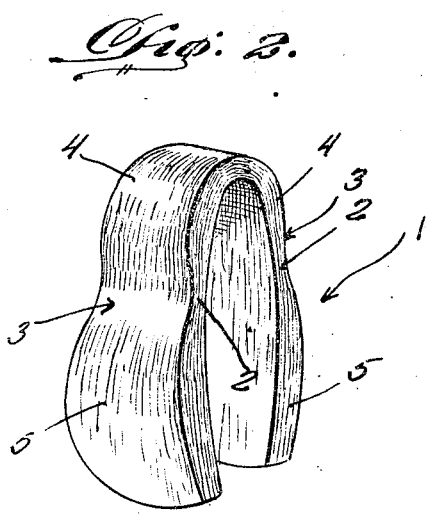
Fig. 2 is a like view of a slightly different embodiment thereof.
Figure 3:
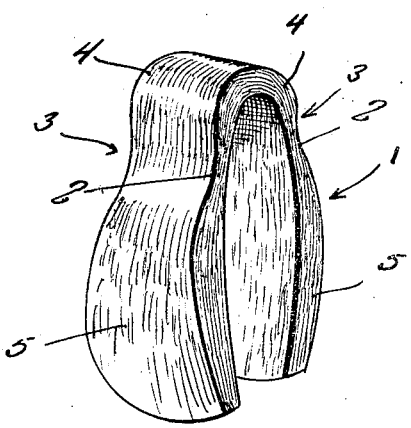
Fig. 3 is a still further embodiment.

In the form seen in Fig. 1, the channels are located at substantially the centers of the opposed side portions, of the pad. In Fig. 2 the channels are disposed slightly above the points shown in Fig. 1, and in Fig. 3 they are disposed very close to the bight portion of the pad. This disposition of the flexible portions is to permit all conditions to be properly handled. With the exception of the disposition of the flexible portions or channels, the different embodiments are identical.

It is thought that the foregoing description taken in connection with the accompanying drawings will enable persons skilled in the art to which the invention relates, to obtain a clear understanding of the same. For this reason a more lengthy description is thought unnecessary.

Although I have shown and described the preferred embodiment of the invention, it is to be understood that minor changes coming within the field of invention claimed may be resorted to if desired.

Having thus described my invention, what I claim as new is:—

A horse collar pad comprising a substantially U-shaped body having its opposite side portions provided with similarly disposed channels formed in the outer surfaces thereof whereby the bottoms of said channels are permitted to move toward and from the collar to conform to the shape of the neck of the horse with which they are in contact.

In testimony whereof I affix my signature.

LEON MORSE JEPPSON.